US012768381B2

(12) United States Patent
Siddikova

(10) Patent No.: US 12,768,381 B2
(45) Date of Patent: Oct. 20, 2026

(54) INTERLOCK PANEL FOR MODULAR SURFACE

(71) Applicant: Oksana Siddikova, Chicago, IL (US)

(72) Inventor: Oksana Siddikova, Chicago, IL (US)

( * ) Notice: Subject to any disclaimer, the term of this patent is extended or adjusted under 35 U.S.C. 154(b) by 0 days.

(21) Appl. No.: 19/202,737

(22) Filed: May 8, 2025

(65) Prior Publication Data

US 2025/0361898 A1 Nov. 27, 2025

Related U.S. Application Data

(60) Provisional application No. 63/651,117, filed on May 23, 2024.

(51) Int. Cl.
*F16B 5/06* (2006.01)

(52) U.S. Cl.
CPC .................................. *F16B 5/0664* (2013.01)

(58) Field of Classification Search
CPC .... F16B 5/0664; F16B 5/0621; F16B 5/0607; F16B 5/06; F16B 5/00
USPC .................................................... 29/428, 592
See application file for complete search history.

(56) References Cited

U.S. PATENT DOCUMENTS 5,778,804 A * 7/1998 Read ..................... F16B 5/0692 248/221.12
9,206,830 B2 * 12/2015 Lu ......................... F16B 21/086
9,631,654 B2 * 4/2017 Liu ....................... F16B 5/0642
11,666,159 B2 * 6/2023 Arriagada Lama .. A47B 87/008 29/428
2015/0139755 A1 * 5/2015 Lu .......................... H05K 7/142 411/510
2015/0192157 A1 * 7/2015 Liu ....................... F16B 5/0642 403/327
2020/0352354 A1 * 11/2020 Arriagada Lama ....... A47F 3/06
2024/0270182 A1 * 8/2024 Hwang .................. B60R 13/04

* cited by examiner

*Primary Examiner* — Lawrence Averick
(74) *Attorney, Agent, or Firm* — Dinsmore & Shohl LLP

(57) ABSTRACT

Disclosed herein is a panel including a front surface, a rear surface opposite the front surface, a side surface extending between the front surface and the rear surface, and a plurality of interlock members, each of the interlock members provided at a respective corner of the panel, each of the interlock members being identical to one another.

20 Claims, 4 Drawing Sheets

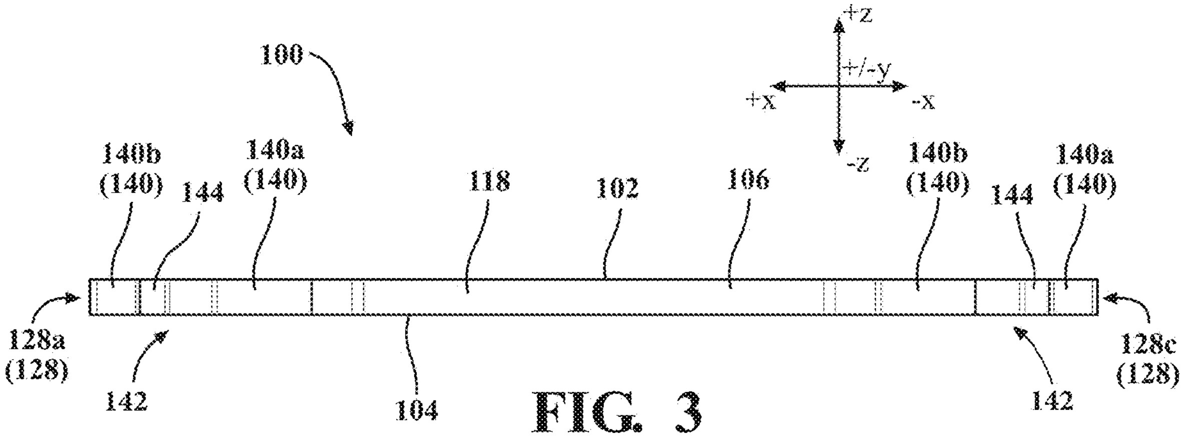
FIG. 3
FIG. 4
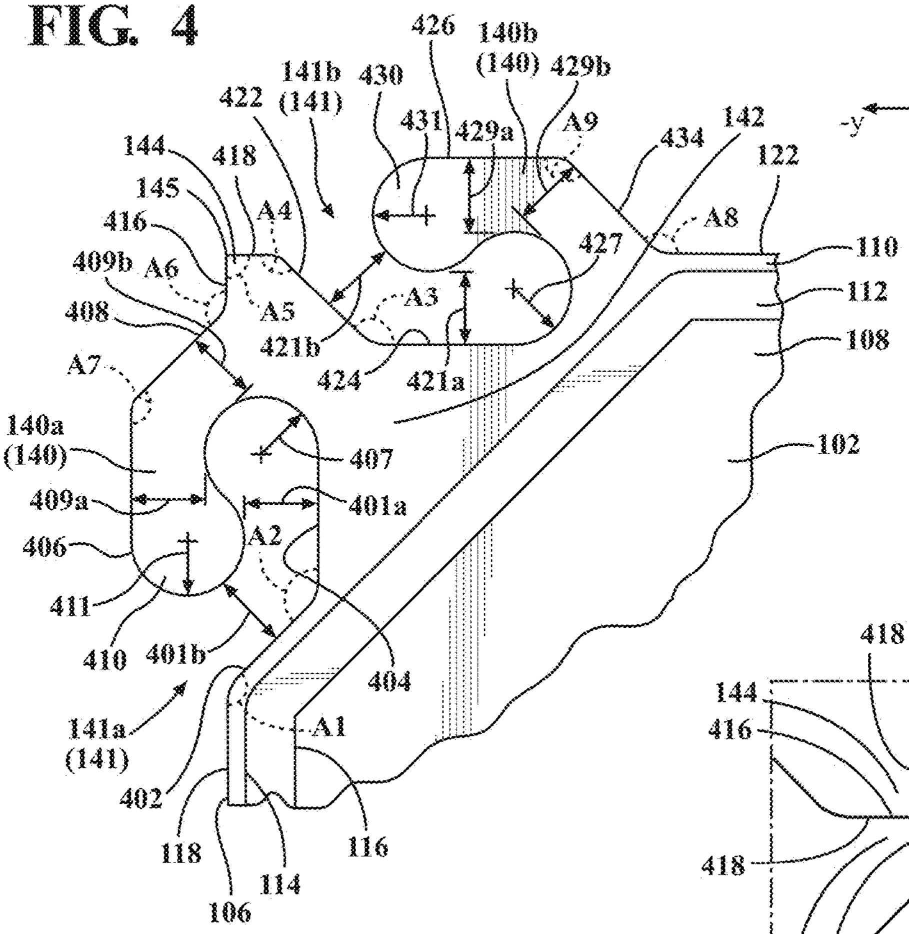
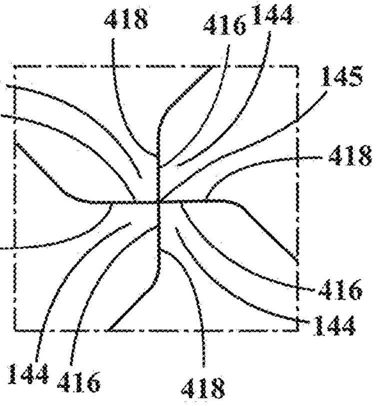
FIG. 6

INTERLOCK PANEL FOR MODULAR SURFACE

CROSS-REFERENCE TO RELATED APPLICATION

This application claims the benefit of U.S. Provisional Patent Application No. 63/651,117, filed May 23, 2024, for "Modular Expandable Surface Cover With Hooked Interlocking Connection Mechanism," which is hereby incorporated by reference in its entirety including the drawings.

TECHNICAL FIELD

The present specification generally relates to panels for engaging with one another and, more specifically, to similarly structured panels that may be joined to form a modular surface.

BACKGROUND

Traditionally, modular surfaces including a plurality of panels may be joined to one another by hand or using tools and materials. The panels may be identical or have different sizes and shapes. However, the overall size and shape of the modular surface may be limited by the particulars of the panels themselves. Additionally, installation and removal of individual panels with other panels may be time consuming and difficult, thus increasing the cost required during assembly.

Accordingly, a need exists for improved panels that interlock to one another during installation without the use of tools and provide for increased customizability.

SUMMARY

In one embodiment, a panel includes a front surface, a rear surface opposite the front surface, a side surface extending between the front surface and the rear surface, and a plurality of interlock members, each of the interlock members provided at a respective corner of the panel, each of the interlock members being identical to one another.

In another embodiment, an assembly includes a plurality of panels, each of the panels including a front surface, a rear surface opposite the front surface, a side surface extending between the front surface and the rear surface, and a plurality of interlock members, each of the interlock members provided at a respective corner of the panel, each of the interlock members being identical to one another, wherein one of the plurality of interlock members of a first panel of the plurality of panels engages with one of the plurality of interlock members of a second panel of the plurality of panels.

In yet another embodiment, a method includes providing a plurality of panels, each panel including a front surface, a rear surface opposite the front surface, a side surface extending between the front surface and the rear surface, and a plurality of interlock members, each of the interlock members provided at a respective corner of the panel, each of the interlock members being identical to one another, and engaging one of the plurality of interlock members of a first panel of the plurality of panels with one of the plurality of interlock members of a second panel of the plurality of panels.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 schematically depicts a side of the panel, according to one or more embodiments shown and described herein;

FIG. 4 schematically depicts an enlarged front view of circle 4 of FIG. 1 illustrating a corner of the panel, according to one or more embodiments shown and described herein;

FIG. 6 schematically depicts an enlarged front view of box 6 of FIG. 5 illustrating a mating portion of a plurality of the panels of the assembly of FIG. 5, according to one or more embodiments shown and described herein.

DETAILED DESCRIPTION

Figure 1:
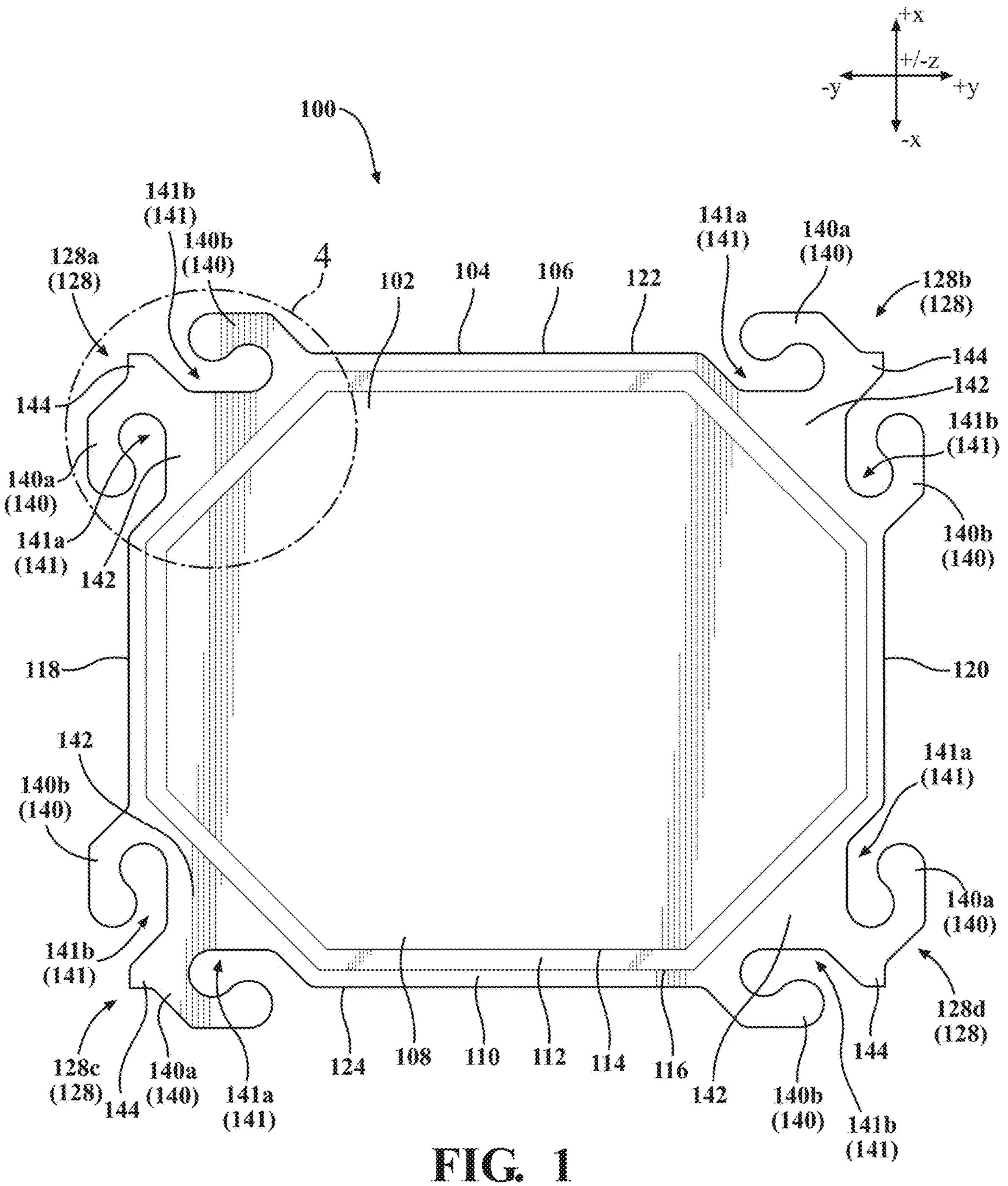
FIG. 1 schematically depicts a front view of a panel, according to one or more embodiments shown and described herein.

Embodiments described herein are directed to a panel that includes a plurality of interlock members able to engage to other identical interlock members.

The panel includes a front surface, rear surface, side surface, and a plurality of interlock members. The plurality of interlock members, provided at respective corners of the panel, engage interlock members of identical panels creating an assembly to cover an entire surface. Various embodiments of the method and apparatus and the operation of the method and apparatus are described in more detail herein. Whenever possible, the same reference numerals will be used throughout the drawings to refer to the same or like parts.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, a panel 100 is illustrated according to one or more embodiments described herein. The panel 100 generally includes a front surface 102, a rear surface 104 (FIG. 2) opposite the front surface 102, and a side surface 106 defining a plurality of corners 128. The front surface 102 includes a front surface body 108, a front surface trim 110, and a groove 112. As shown, in embodiments, the groove 112 has a substantially octagonal shape and is recessed into the front surface 102. The groove 112 includes a groove interior edge 114 and a groove exterior edge 116 and extends parallel to the side surface 106 of the panel 100 within a boundary defined by the corners 128.

The side surface 106 includes a first side surface 118, a second side surface 120 opposite the first side surface 118, an upper side surface 122, and a lower side surface 124 opposite the upper side surface 122. The corners 128 include a first corner 128*a*, a second corner 128*b*, a third corner 128*c*, and a fourth corner 128*d*. As used herein, the first corner 128*a*, the second corner 128*b*, the third corner 128*c*, and the fourth corner 128*d* may be referred to as the corners 128 when generally referring to any one of the corners 128. Each corner 128 includes a corner body 142 and at least one hook 140 extending from the corner body 142. The embodiment in FIG. 1 includes a first hook 140*a* and a second hook 140*b*. However, it should be appreciated that the corners 128 may include any number of hooks 140 such as more than two. As described in more detail herein, the first hook 140*a* extends from the corner body 142 and cooperates with the corner body 142 to include a corner peak 144 and a first recess 141*a*. Similarly, the second hook 140*b* extends from the corner body 142 and cooperates with the corner body 142 to define a second recess 141*b*.

The first corner 128*a* extends between the first side surface 118 and the upper side surface 122. The second corner 128*b* extends between the upper side surface 122 and the second side surface 120. The third corner 128*c* extends between the first side surface 118 and the lower side surface 124. The fourth corner 128*d* extends between the lower side surface 124 and the second side surface 120.

Figure 2:
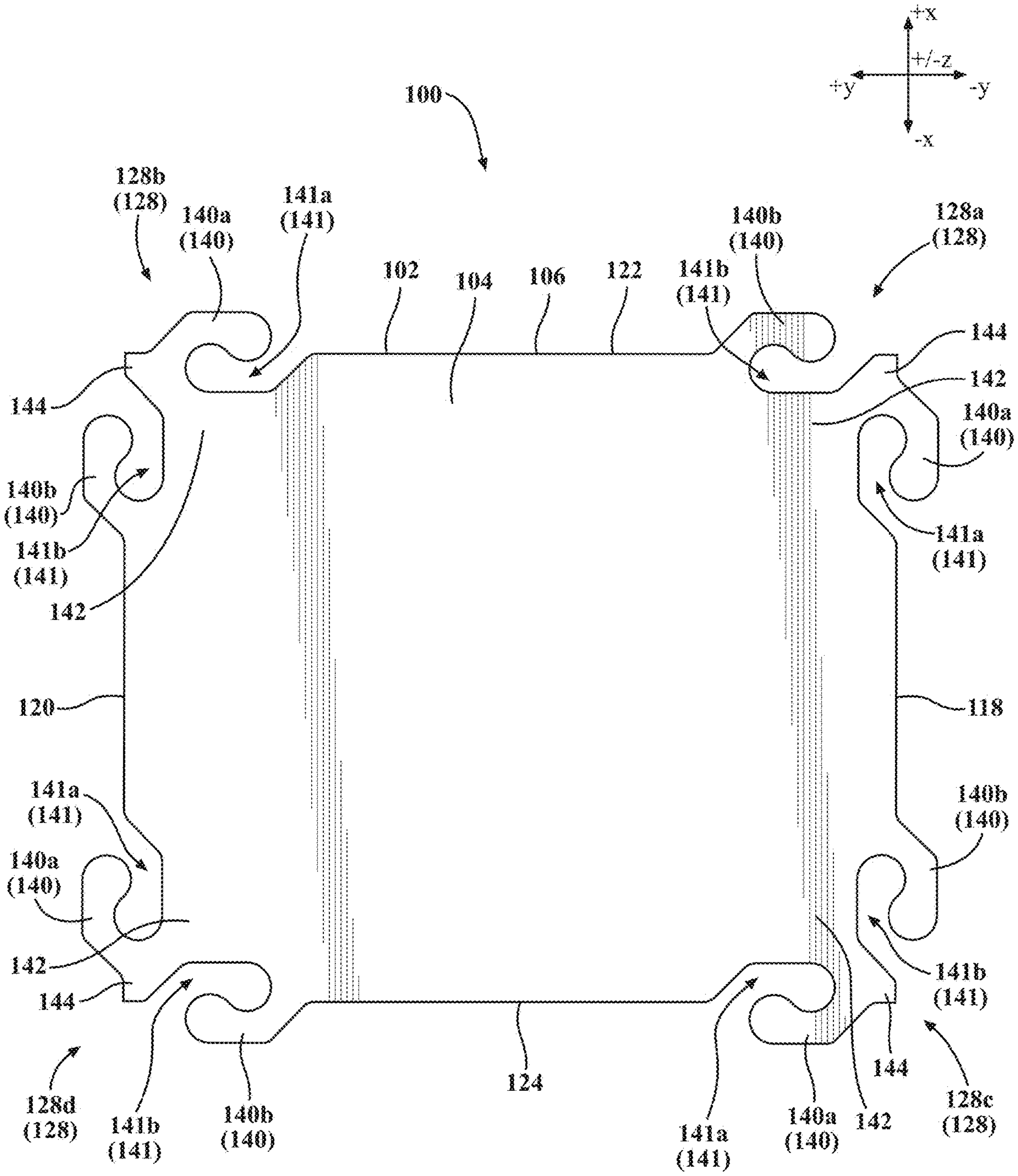
FIG. 2 schematically depicts a rear view of the panel, according to one or more embodiments shown and described herein.

Referring now to FIG. 2, the rear surface 104 of the panel 100 is shown. The rear surface 104 is a continuous, generally flat surface without indents similar to the groove 112 shown in FIG. 1.

Referring now to FIG. 3, the panel 100 is shown from the side surface 106. This shows constant thickness across the side surface 106, the hooks 140, the corner bodies 142, and the corner peaks 144. The only part of the panel 100 not maintaining this constant thickness is the thickness of the panel at the groove 112 on the front surface 102. This is where the panel 100 has a smaller thickness as it cannot be seen from the side view of FIG. 3. In the embodiment described herein, no part of the panel 100 has a larger thickness as it would be seen in the side view of FIG. 3.

The entirety of the first side surface 118 of the side surface 106 is shown. The hooks 140 of the first corner 128*a* are shown left of the first side surface 118 of the side surface 106 while the hooks 140 of the third corner 128*c* are shown right of the first side surface 118. Within the first corner 128*a*, in order from left to right, are the second hook 140*b*, the corner peak 144 of the first hook 140*a*, and the first hook 140*a* of the first corner 128*a*. Within the third corner 128*c*, in order from left to right, are the second hook 140*b*, the corner peak 144, and the first hook 140*a* of the third corner 128*c*.

Referring now to FIG. 4, the first corner 128*a* is illustrated in more detail. Although only the first corner 128*a* is described in more detail herein, it should be appreciated that the second corner 128*b*, the third corner 128*c*, and the fourth corner 128*d* each have identical structure.

With more particularity, the first corner 128*a* includes a corner edge 402 extending from the first side surface 118 to the corner body 142. The corner edge 402 extends from the first side surface 118 of the corner body 142 at a first angle A1. In embodiments, the first angle A1 is 135 degrees+/−20 degrees. The corner body 142 is defined by a first corner body edge 404 and a second corner body edge 424. The first corner body edge 404 extends from the corner edge 402 at a second angle A2. In embodiments, the second angle A2 is 135 degrees+/−20 degrees. The first hook 140*a* extends from the corner body 142 between the first corner body edge 404 and the second corner body edge 424. The first hook 140*a* includes a protrusion edge 422 extending in a direction opposite the corner body 142, a return edge 408 extending from the protrusion edge 422, and a first head edge 406 extending from the return edge 408 to the corner body 142. The protrusion edge 422 extends from the second corner body edge 424 at a third angle A3. In embodiments, the third angle A3 is 135 degrees+/−20 degrees. The protrusion edge 422 defines the corner peak 144 including a first peak side 416 facing a direction opposite the second hook 140*b*, and a second peak side 418 facing the second hook 140*b*. The first peak side 416 and the second peak side 418 meet to define a corner peak apex 145. The protrusion edge 422 extends from the second peak side 418 at a fourth angle A4. In embodiments, the fourth angle A4 is 135 degrees+/−20 degrees. The first peak side 416 extends from the second peak side 418 at a fifth angle A5. In embodiments, the fifth angle A5 is 90 degrees+/−20 degrees. The return edge 408 extends from the first peak side 416 to the first head edge 406. The return edge 408 extends from the first peak side 416 at a sixth angle A6. In embodiments, the sixth angle A6 is 135 degrees+/−20 degrees. The first head edge 406 extends from the return edge 408 at a seventh angle A7. In embodiments, the seventh angle A7 is 135 degrees+/−20 degrees.

Referring now to the second hook 140*b* in FIG. 4, the second hook 140*b* extends from the corner body 142 between the second corner body edge 424 and the upper side surface 122. The second hook 140*b* includes an extension edge 434 extending from the upper side surface 122 of the corner body 142 in a direction opposite the groove 112 and a second head edge 426 extending from the extension edge 434 to the second corner body edge 424 of the corner body 142. The extension edge 434 extends from the upper side surface 122 at an eighth angle A8. In embodiments, the eighth angle A8 is 135 degrees+/−20 degrees. The second head edge 426 extends from the extension edge 434 at a ninth angle A9. In embodiments, the ninth angle A9 is 135 degrees+/−20 degrees.

The first head edge 406 defines a first distal end portion 410 having a first head radius 411, that when doubled into a diameter, is greater than a second width 409*b* defined between the return edge 408 and the first recess 141*a*. The first head edge 406 has a sinusoidal shape extending from the return edge 408 to the first corner body edge 404. The second head edge 426 defines a second distal end portion 430 having a second head radius 431, that when doubled into a diameter, is greater than a second width 429*b* defined between the extension edge 434 and the second recess 141*b*.

The second head edge 426 has a sinusoidal shape extending from the extension edge 434 to the second corner body edge 424.

The first recess 141*a* defines a bulbous portion corresponding to the shape of the second distal end portion 430 of the second head edge 426. Accordingly, a first recess radius 407 of the bulbous portion of the first recess 141*a* is slightly larger than the radius of the second distal end portion 430 defined by the second head edge 426. The second recess 141*b* defines a bulbous portion corresponding to the shape of the first distal end portion 410 of the first head edge 406. Accordingly, a second recess radius 427 of the bulbous portion of the second recess 141*b* is slightly larger than the first head radius 411 of the first distal end portion 410 defined by the first head edge 406.

Still referring to FIG. 4, the first corner 128*a*, like all other corners (128*b*, 128*c*, and 128*d*) includes hooks 140 that define recesses 141. The first hook 140*a* of the first corner 128*a* defines the first recess 141*a*. The first recess 141*a* is defined by the corner edge 402, first corner body edge 404, and a first head edge 406. The second hook 140*b* of the first corner 128*a* defines the second recess 141*b*. The second recess 141*b* is defined by the protrusion edge 422, a second corner body edge 424, and a second head edge 426.

In embodiments, the first hook 140*a* has a first width 409*a* defined between the first head edge 406 and a different part of the first head edge 406, measured perpendicular to the first corner body edge 404 and in line with the center of the first recess radius 407. The first recess 141*a* has a recess first width 401*a* that is defined between first head edge 406 and the first corner body edge 404, measured perpendicular to the first corner body edge 404, and in line with the center of the first head radius 411. The first recess 141*a* has a recess second width 401*b* that is defined between the first head edge 406 and the corner edge 402, measured perpendicular to the corner edge 402, and in line with the center of the first head radius 411.

In embodiments, the second hook 140*b* has a first width 429*a* defined between a first portion of the second head edge 426 located a first distance from the corner 142 and a second portion of the second head edge 426 located a second distance from the corner 142 less than the first distance. The first width 429*a* is measured perpendicular to the second corner body edge 424 and in line with the center of the second recess radius 427. The second recess 141*b* has a recess first width 421*a* that is defined between second head edge 426 and the second corner body edge 424, measured perpendicular to the second corner body edge 424, and in line with the center of the second head radius 431. The second recess 141*b* has a recess second width 421*b* that is defined between the second head edge 426 and the protrusion edge 422, measured perpendicular to the protrusion edge 422, and in line with the center of the second head radius 431.

In embodiments, the recess first width 401*a* is equal to the recess first width 421*a*, and the recess second width 401*b* is equal to the recess second width 421*b*. In embodiments, the first width 409*a* is equal to the first width 429*a*, and the second width 409*b* is equal to the second width 429*b*. In embodiments, the first head radius 411 is equal to the second head radius 431, and the first recess radius 407 is equal to the second recess radius 427.

Still referring to FIG. 4, the corners 128 of the panel 100 are designed to engage with other corners 128 of other panels 100. The first hook 140*a* of one corner 128 fits into the second recess 141*b* of a different corner 128. Therefore, the first width 409*a* is slightly smaller than the recess first width 421*a*, and the second width 409*b* is slightly smaller than the recess second width 421*b*. The second hook 140*b* of one corner 128 fits into the first recess 141*a* of a different corner 128. Therefore, the first width 429*a* is slightly smaller than the recess first width 401*a*, and the second width 429*b* is slightly smaller than the recess second width 401*b*. The first distal end portion 410 of one corner 128 can be received by the second recess 141*b* of a different corner 128. Therefore, the first head radius 411 is slightly smaller than the second recess radius 427. The second distal end portion 430 of one corner 128 can be received by the first recess 141*a* of a different corner 128. Therefore, the second head radius 431 is slightly smaller than the first recess radius 407.

In embodiments, when the first hook 140*a* of one corner 128 engages with the second recess 141*b* of a different corner 128, or when the second hook 140*b* of one corner 128 engages with the first recess 141*a* of a different corner 128, specific edges of the different corners 128 are adjacent. For instance, the first side 118 is adjacent the second side 120, the corner edge 402 is adjacent the extension edge 434, the first corner body edge 404 is adjacent the second head edge 426, the first head edge 406 is adjacent the second head edge 426 and the second corner body edge 424, the return edge 408 is adjacent the protrusion edge 422, the first peak side 416 is adjacent the second peak side 418, and the corner peak apex 145 of each corner 128 are adjacent one another. Also in this engagement, the first angle A1 is equal to the eighth angle A8, the second angle A2 is equal to the ninth angle A9, the seventh angle A7 is equal to the third angle A3, the sixth angle A6 is equal to the fourth angle A4, and the fifth angle of each corner 128 are equal to one another.

Figure 5:
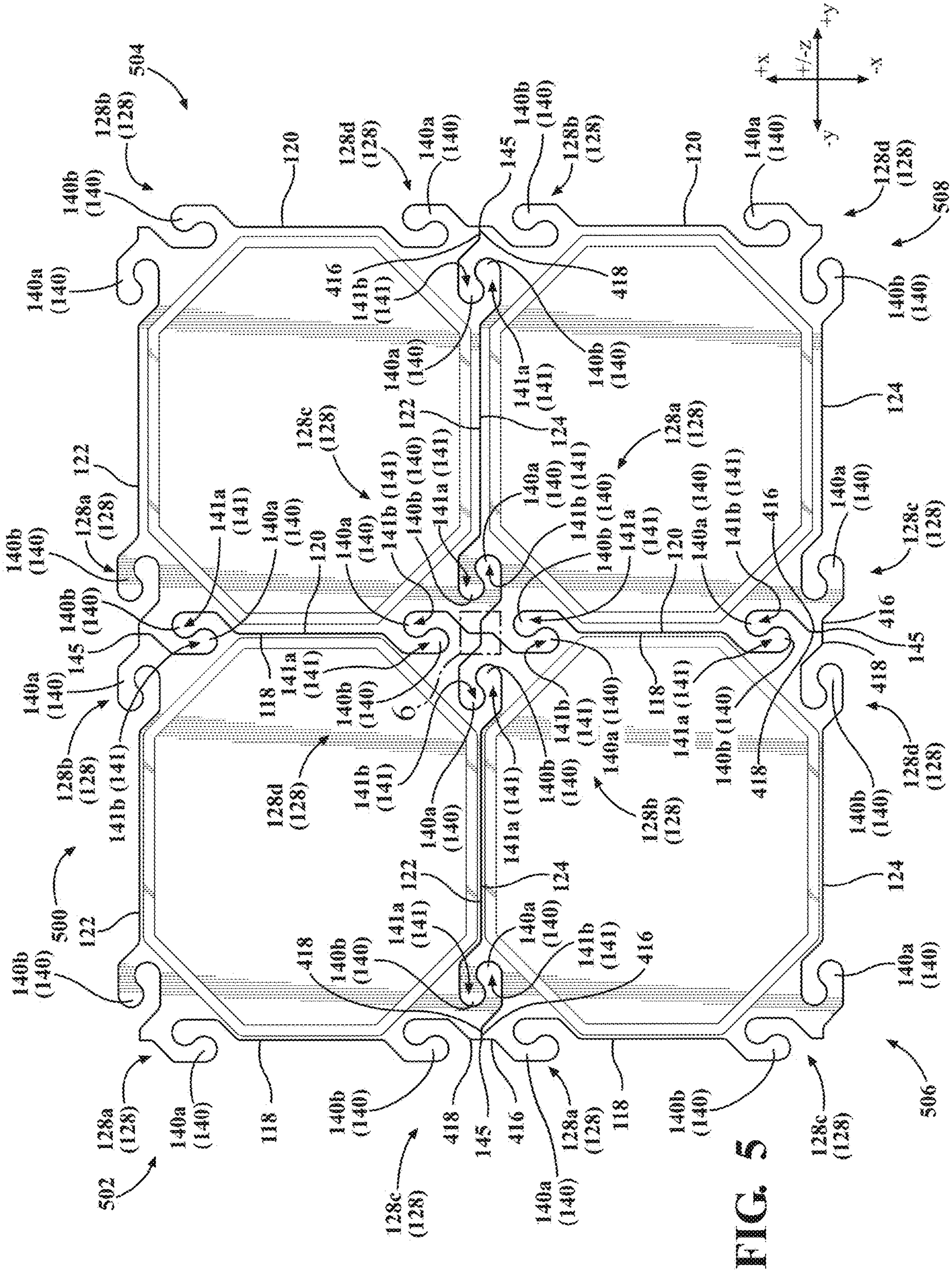
FIG. 5 schematically depicts a front view of an assembly including a plurality of the panels of FIG. 1, according to one or more embodiments shown and described herein.

Referring now to FIG. 5, an assembly 500 is shown formed by attaching a plurality of the panels 100. The panels 100 includes a first panel 502, a second panel 504, a third panel 506, and a fourth panel 508. In FIG. 5, the assembly 500 shows the plurality of panels 100 engaged with one another. It should be appreciated the panels 100 are identical in structure. Additionally, although only four panels 100 are shown as forming the assembly 500. It should be appreciated that any number of panels 100 may be used to form the assembly 500 to have any suitable width and/or length. Additionally, although identical panels 100 are illustrated, it should be appreciated that the panels 100 may not be identical and each have different widths, lengths, heights, and the like. Similarly, the panels 100 may each be formed from the same material or a different material.

The plurality of panels 100 are each oriented in the same direction with the front surface 102 facing the same direction, as shown. When the panels 100 are engaged with one another, as shown in FIG. 5, the side surface 106 of each panel 100 is adjacent the side surface 106 of a different panel 100. When a corner 128 of a panel 100 is engaged with a different corner 128 of a different panel 100, then at least one hook 140 of one corner 128 is engaged with a different hook 140 of a different corner 128. When two corners 128 of a panel 100 are engaged with two corners 128 of a different panel 100, then two hooks 140 on different corners 128 are engaged with two different hooks 140 on different corners 128. At least two of the corners 128 of each panel 100 are engaged with at least two corners 128 of other panels 100. As shown in FIG. 5, the second side surface 120 of the first panel 502 is adjacent the first side surface 118 of the second panel 504, and the lower side surface 124 of the first panel 502 is adjacent to the upper side surface 122 of the third panel 506. Additionally, the lower side surface 124 of the second panel 504 is adjacent to the upper side surface 122 of the fourth panel 508, and the second side surface 120 of the third panel 506 is adjacent to the first side surface 118 of the fourth panel 508.

As shown in FIG. 5, the first corner 128*a* of the first panel 502 is not engaged with any other panels 100. Therefore, the first hook 140*a* and the second hook 140*b* of the first corner 128*a* of the first panel 502 are not engaged in recesses 141. The second corner 128*b* of the first panel 502 is engaged with the first corner 128*a* of the second panel 504. Specifically, the second hook 140*b* of the second corner 128*b* of the first panel 502 is received within the first recess 141*a* of the first corner 128*a* of the second panel 504, and the first hook 140*a* of the first corner 128*a* of the second panel 504 is received within the second recess 141*b* of the second corner 128*b* of the first panel 502. The first hook 140*a* of the second corner 128*b* of the first panel 502 and the second hook 140*b* of the first corner 128*a* of the second panel 504 are not engaged in recesses 141.

Similarly, the third corner 128*c* of the first panel 502 is engaged with the first corner 128*a* of the third panel 506. Specifically, the first hook 140*a* of the third corner 128*c* of the first panel 502 is received within the second recess 141*b* of the first corner 128*a* of the third panel 506, and the second hook 140*b* of the first corner 128*a* of the third panel 506 is received within the first recess 141*a* of the third corner 128*c* of the first panel 502. The second hook 140*b* of the third corner 128*c* of the first panel 502 and the first hook 140*a* of the first corner 128*a* of the third panel 506 are not engaged in recesses 141.

The fourth corner 128*d* of the first panel 502 simultaneously engages both the third corner 128*c* of the second panel 504 and the second corner 128*b* of the third panel 506. Specifically, the first hook 140*a* of the fourth corner 128*d* of the first panel 502 is received within the second recess 141*b* of the third corner 128*c* of the second panel 504, and the second hook 140*b* of the third corner 128*c* of the second panel 504 is received within the first recess 141*a* of the fourth corner 128*d* of the first panel 502. Also, the second hook 140*b* of the fourth corner 128*d* of the first panel 502 is received within the first recess 141*a* of the second corner 128*b* of the third panel 506, and the first hook 140*a* of the second corner 128*b* of the third panel 506 is received within the second recess 141*b* of the fourth corner 128*d* of the first panel 502.

Still referring to FIG. 5, the engagements of the first corner 128*a* of the second panel 504 are described above. The second corner 128*b* of the second panel 504 is not engaged with any other panels 100. Therefore, the first hook 140*a* and the second hook 140*b* of the second corner 128*b* of the second panel 504 are not engaged in recesses 141. The engagements of the third corner 128*c* of the second panel 504 to the fourth corner 128*d* of the first panel 502 are described above. However, the third corner 128*c* of the second panel 504 is simultaneously engaged with the first corner 128*a* of the fourth panel 508. Specifically, the first hook 140*a* of the third corner 128*c* of the second panel 504 is received within the second recess 141*b* of the first corner 128*a* of the fourth panel 508, and the second hook 140*b* of the first corner 128*a* of the fourth panel 508 is received within the first recess 141*a* of the third corner 128*c* of the second panel 504. The second hook 140*b* of the fourth corner 128*d* of the second panel 504 is received within the first recess 141*a* of the second corner 128*b* of the fourth panel 508, and the first hook 140*a* of the second corner 128*b* of the fourth panel 508 is received within the second recess 141*b* of the fourth corner 128*d* of the second panel 504. The first hook 140*a* of the fourth corner 128*d* of the second panel 504, and the second hook 140*b* of the second corner 128*b* of the fourth panel 508 are not engaged in recesses 141.

The engagements of the first corner 128*a* of the third panel 506 are described above. The engagements of the second corner 128*b* of the third panel 506 to the fourth corner 128*d* of the first panel 502 are described above. However, the second corner 128*b* of the third panel 506 is simultaneously engaged with the first corner 128*a* of the fourth panel 508. Specifically, the second hook 140*b* of the second corner 128*b* of the third panel 506 is received within the first recess 141*a* of the first corner 128*a* of the fourth panel 508, and the first hook 140*a* of the first corner 128*a* of the fourth panel 508 is received within the second recess 141*b* of the second corner 128*b* of the third panel 506. The third corner 128*c* of the third panel 506 is not engaged with any other panels 100. Therefore, the first hook 140*a* and the second hook 140*b* of the third corner 128*c* of the third panel 506 are not engaged in recesses 141. The first hook 140*a* of the fourth corner 128*d* of the third panel 506 is received within the second recess 141*b* of the third corner 128*c* of the fourth panel 508, and the second hook 140*b* of the third corner 128*c* of the fourth panel 508 is received within the first recess 141*a* of the fourth corner 128*d* of the third panel 506. The second hook 140*b* of the fourth corner 128*d* of the third panel 506 and the first hook 140*a* of the third corner 128*c* of the fourth panel 508 are not engaged in recesses 141.

Finally, the engagements of the first corner 128*a*, the second corner 128*b*, and the third corner 128*c* of the fourth panel 508 are described above. The fourth corner 128*d* of the fourth panel 508 is not engaged with any other panels 100. Therefore, the first hook 140*a* and the second hook 140*b* of the fourth corner 128*d* of the fourth panel 508 are not engaged in recesses 141.

Referring now to FIG. 6, the center of the assembly 500 from FIG. 5 is shown including the corner peaks 144 of the fourth corner 128*d* of the first panel 502, the third corner 128*c* of the second panel 504, the second corner 128*b* of the third panel 506, and the first corner 128*a* of the fourth panel 508. These corner peaks 144 are all adjacent. The first peak side 416 and the second peak side 418 of the fourth corner 128*d* of the first panel 502 are adjacent the second peak side 418 of the third corner 128*c* of the second panel 504 and the first peak side 416 of the second corner 128*b* of the third panel 506, respectively. The first peak side 416 of the third corner 128*c* of the second panel 504 is adjacent the second peak side 418 of the first corner 128*a* of the fourth panel 508. Finally, the second peak side 418 of the second corner 128*b* of the third panel 506 is adjacent the first peak side 416 of the first corner 128*a* of the fourth panel 508. Each corner peak apex 145 of the fourth corner 128*d* of the first panel 502, the third corner 128*c* of the second panel 504, the second corner 128*b* of the third panel 506, and the first corner 128*a* of the fourth panel 508 meet at a center focal point.

From the above, it is to be appreciated that defined herein is a panel which includes a front surface, a rear surface opposite the front surface, a side surface extending between the front surface and the rear surface, and a plurality of interlock members. Each of the interlock members are provided at a respective corner of the panel, are identical to one another, and are engaged together with one another. Multiple engaged panels are also cut and placed over other surfaces.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A panel comprising:
a front surface;
a rear surface opposite the front surface;
a side surface extending between the front surface and the rear surface; and
a plurality of interlock members,
each of the interlock members extending in the same plane from a respective corner of the panel,
each of the interlock members being identical to one another.

2. The panel of claim 1, wherein the front surface and the rear surface have a substantially rectangular shape.

3. The panel of claim 1, wherein the plurality of interlock members comprises four interlock members, each of the four interlock members extending from a respective one of four corners of the panel.

4. The panel of claim 1, wherein each of the interlock members comprises one or more hooks.

5. The panel of claim 4, wherein the one or more hooks comprises a first hook and a second hook.

6. The panel of claim 5, wherein the first hook includes a first recess and the second hook includes a second recess.

7. The panel of claim 6, wherein the first recess engages with a second hook of an identical panel and the second recess engages with a first hook of an identical panel.

8. The panel of claim 5, wherein the first hook protrudes from a center of the respective corner and the second hook protrudes from a right side of the respective corner.

9. The panel of claim 5, wherein the first hook includes a 90 degree protrusion.

10. The panel of claim 1, wherein a groove is formed in the front surface within a boundary defined by the plurality of corners.

11. The panel of claim 10, wherein the groove has an octagonal shape.

12. A panel comprising:
a front surface;
a rear surface opposite the front surface;
a side surface extending between the front surface and the rear surface; and
a plurality of interlock members, each of the interlock members provided at a respective corner of the panel, each of the interlock members being identical to one another, wherein:
each of the interlock members comprises one or more hooks;
the one or more hooks comprises a first hook and a second hook;
the first hook includes a first recess and the second hook includes a second recess; and
the first recess engages with a second hook of an identical panel and the second recess engages with a first hook of an identical panel.

13. The panel of claim 12, wherein the front surface and the rear surface have a substantially rectangular shape.

14. The panel of claim 12, wherein the plurality of interlock members comprises four interlock members, each of the four interlock members provided at a respective one of four corners of the panel.

15. The panel of claim 12, wherein the first hook protrudes from a center of the respective corner and the second hook protrudes from a right side of the respective corner.

16. The panel of claim 12, wherein the first hook includes a 90 degree protrusion.

17. A panel comprising:
a front surface;
a rear surface opposite the front surface;
a side surface extending between the front surface and the rear surface; and
a plurality of interlock members, each of the interlock members provided at a respective corner of the panel, each of the interlock members being identical to one another, wherein:
a groove is formed in the front surface within a boundary defined by the plurality of corners; and
the groove has an octagonal shape.

18. The panel of claim 17, wherein the front surface and the rear surface has a substantially rectangular shape.

19. The panel of claim 17, wherein the plurality of interlock members comprises four interlock members, each of the four interlock members extending from a respective one of four corners of the panel.

20. The panel of claim 17, wherein each of the interlock members comprises one or more hooks.

* * * * *